(12) United States Patent
Loaiza Alvarez et al.

(10) Patent No.: US 9,771,191 B2
(45) Date of Patent: Sep. 26, 2017

(54) REVERSIBLE LID AND CONTAINER FORMING A VARIABLE-VOLUME FOOD CANISTER

(71) Applicant: SEB S.A., Ecully (FR)

(72) Inventors: Jorge Loaiza Alvarez, Medellin (CO); David Sanchez Grisales, Barcelona (ES); Catalina Balseiro Botero, Annecy (FR); Stephane Plichon, Alonzier-la-Caille (FR); Nicolas Nys, Annecy (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 14/956,872

(22) Filed: Dec. 2, 2015

(65) Prior Publication Data

US 2016/0152387 A1   Jun. 2, 2016

(30) Foreign Application Priority Data

Dec. 2, 2014 (FR) ...................... 14 61802

(51) Int. Cl.
*B65D 51/16* (2006.01)
*B65D 43/02* (2006.01)
(Continued)

(52) U.S. Cl.
CPC ........ *B65D 51/1644* (2013.01); *A47J 36/027* (2013.01); *A47J 47/10* (2013.01); *B65D 43/02* (2013.01); *B65D 43/0208* (2013.01); *B65D 2251/09* (2013.01); *B65D 2543/00027* (2013.01); *B65D 2543/0074* (2013.01); *B65D 2543/00203* (2013.01); *B65D 2543/00296* (2013.01); *B65D 2543/00361* (2013.01); *B65D 2543/00481* (2013.01); *B65D 2543/00518* (2013.01); *B65D 2543/00537* (2013.01); (Continued)

(58) Field of Classification Search
CPC . B65D 77/225; B65D 21/022; B65D 21/0219
USPC ............ 220/203.04, 203.01, 203.02, 203.03; 137/493.8, 493.9, 493
See application file for complete search history.

(56) References Cited

U.S. PATENT DOCUMENTS 2,416,900 A * 3/1947 Busby ................ B65D 51/1683
215/307
4,091,953 A    5/1978 Daenen
(Continued)

FOREIGN PATENT DOCUMENTS

EP       1332982 A1    8/2003

*Primary Examiner* — Jeffrey Allen
(74) *Attorney, Agent, or Firm* — The Webb Law Firm

(57) ABSTRACT

Reversible lid (1) for a storage or reheating canister, comprising a first (2) airtight attachment means designed to cooperate with an upper edge (4) of a container (5) when the lid (1) is arranged along a first direction on the container (5) and a second (3) airtight attachment means designed to cooperate with said upper edge (4) of the container (5) when the lid is arranged in the reverse direction on the container (5), characterized in that the lid (1) comprises a two-way steam release mechanism (10), connecting the two opposite surfaces of the lid, and in that said two-way release mechanism (10) allows a flow to pass between the two surfaces of the lid (1) when the pressure difference between the two surfaces is greater than or equal to a value (P0), particularly when reheating food in a microwave oven.

12 Claims, 5 Drawing Sheets

(51) Int. Cl.
*A47J 36/02* (2006.01)
*A47J 47/10* (2006.01)

(52) U.S. Cl.
CPC .............. *B65D 2543/00555* (2013.01); *B65D 2543/00629* (2013.01); *B65D 2543/00685* (2013.01); *B65D 2543/00796* (2013.01); *B65D 2543/00842* (2013.01)

(56) References Cited

U.S. PATENT DOCUMENTS

| | | | |
|---|---|---|---|
| 4,181,146 A | 1/1980 | Goglio | |
| 5,409,126 A | 4/1995 | DeMars | |
| 2013/0184375 A1* | 7/2013 | Aoyama | ............... C08F 285/00 523/220 |

* cited by examiner

REVERSIBLE LID AND CONTAINER FORMING A VARIABLE-VOLUME FOOD CANISTER

CROSS-REFERENCE TO RELATED APPLICATION

This application claims priority to French Patent Application No. 1461802 filed Dec. 2, 2014, the disclosure of which is hereby incorporated in its entirety by reference.

BACKGROUND OF THE INVENTION

This invention generally pertains to a food canister for storing and reheating food.

DESCRIPTION OF RELATED ART

More specifically, the invention pertains to a canister with a variable volume that comprises a reversible lid adapted for storing and reheating food.

Variable-volume food canisters for storing food already exist, and also aim to decrease the amount of air contained inside the food storage space, in order to reduce the air-related oxidation of the food. Having a variable volume also makes it possible to store a greater quantity of food.

To this end, these canisters comprise two tubs, including one large tub and one smaller tub. The tubs are built in such a way that the smaller of the two tubs can be placed inside the larger one, in a reversible manner, and in this stacked position, the smaller tub acts as a closure element for the larger tub. If the volume of food being stored in the larger tub so requires, the smaller tub can be reversed in response to this particular situation, and the storage volume of the canister will thus be increased, and it is also used as a closure element for the larger tub.

U.S. Pat. No. 4,091,953 describes such a device.

One of the disadvantages presented by such a device pertains to the case in which a user wishes to reheat the food contained in the canister directly in a microwave oven, regardless of the canister closure configuration. Indeed, when placed in the microwave, if the pressure inside the canister rises above a certain level, the closure system is no longer capable of fastening the two tubs to one another, which results in one of the tubs popping off inside the microwave. This is due to the inability to release the steam in a controlled manner.

This invention therefore aims to resolve the aforementioned problems by offering a variable-volume canister that is adapted for storing and reheating food, and to do so regardless of the canister closure configuration.

SUMMARY OF THE INVENTION

In order to reach this objective, the invention pertains to a reversible lid for a storage or reheating canister, comprising a first airtight attachment means designed to cooperate with an upper edge of a container when the lid is arranged in a first direction on the container, and a second airtight attachment means designed to cooperate with the upper edge of the container when the lid is arranged in the opposite direction on the container, the lid having a part in relief that can be oriented toward the inside of the container to form, with said container, a first closed interior space with a first volume, or oriented toward the exterior of the container to form, with said container, a second closed interior space with a second volume, separate from the first volume, characterized in that the lid comprises a two-way steam release mechanism connecting two opposite surfaces of the lid, and in that the two-way release mechanism allows a flow to pass between the two surfaces of the lid when the pressure difference between the two surfaces is greater than or equal to a value (P0), particularly when reheating food in a microwave oven.

One advantage procured by such a lid is that the closed canister can be placed in the microwave oven regardless of its volume and is therefore adapted for reheating food.

In one characteristic of the invention, the two-way steam release mechanism is airtight when the pressure difference between the two surfaces of the lid is less than Value P0.

The advantage is having an airtight volume inside the canister, which makes it adapted for storing food.

In one characteristic of the invention, the two-way steam release mechanism is designed to ensure a watertight seal.

The advantage is having a canister that is adapted for food storage, whether liquid or solid, and that makes it possible to prevent leaks outside of the canister, particularly during transport if the canister is turned over.

In one characteristic of the invention, the two-way steam release mechanism comprises a first one-way valve that allows a flow of steam to pass through when the pressure difference between a first surface and a second surface of the lid is greater than or equal to a value, and that is airtight when the pressure difference between the first and the second surface of the lid is less than P0, and a second valve, positioned opposite the first valve, which allows a flow of steam to pass through when the pressure difference between the second surface and the first surface of the lid is greater than or equal to a value P0, and that is airtight when the pressure difference between the second and the first surface of the lid is less than P0.

The advantage is having a lid that is adapted for reheating and storing food or liquids.

In one characteristic of the invention, the first valve consists of a first cover and one or more primary channels passing through the lid, said first cover is fastened on one side of the lid by a first fastening means, and it covers the one or more primary channels completely and in an airtight manner, and starting at Pressure P0 and above, said first cover warps under the effect of a flow circulating in the one or more primary channels, such that the flow from the first or the second interior space can pass through toward the exterior of said space, through the one or more primary channels, and the second valve consists of a second cover and one or more secondary channels passing through the lid, said second cover is fastened on the lid, on the opposite side of the first cover, by a second fastening means, and it covers the one or more secondary channels completely and in an airtight manner, and starting at Pressure P0 and above, said second cover warps under the effect of a flow circulating in the one or more secondary channels, so as to allow the flow to pass from the first or the second interior space to the exterior through the one or more secondary channels.

The advantage is having a two-way release mechanism with two valves that function in opposition and the two valves are positioned independently of one another.

In one characteristic of the invention, the first and the second cover are positioned opposite one another, on either side of the lid, the first fastening means and the second fastening means are assembled into one shared fastening means that consists of a central opening passing through the lid from one side to the other of said lid, and in which a tightly-mounted central hub fastens the first and the second covers together, and the first cover is an airtight cover on the one or more secondary channels, and the second cover is an airtight cover on the one or more primary channels.

The advantage is having a two-way release mechanism with two valves that function in opposition and that are combined.

In one characteristic of the invention, the first cover comprises one or more primary through-holes that are positioned opposite the one or more secondary channels, and the second cover comprises one or more secondary through-holes that are positioned opposite the one or more primary channels.

The advantage is having two valves that function in opposition and that are combined to allow for reheating and storing food in the canister.

In one characteristic of the invention, the one or more primary channels or the one or more secondary channels comprise one or more shoulders that go up into the one or more primary through-holes or into the one or more secondary through-holes, so as it increase the effectiveness of the airtight seal by limiting the passage of water between the covers and the lid.

In one characteristic of the invention, the lid comprises a domed area on which the covers are positioned under tension, so as to prevent any flow from passing through.

The advantage is increasing the airtight seal of the two valves.

In one characteristic of the invention, a flange that surrounds the covers is integrated on either side of the lid, so as to ensure an airtight seal preventing any flow from the first or the second interior space.

The advantage is increasing the airtight seal of the two valves.

In one characteristic of the invention, the covers are made of silicone or thermoplastic elastomers (TPE).

In one characteristic of the invention, the first and second airtight attachment means consist of a flap positioned on the perimeter and on the exterior of the lid, and the flap comprises a first sealing groove placed above said flap and a second sealing groove placed below the flap; and the first and the second grooves have a U-shaped profile.

In one characteristic of the invention, the covers comprise, on their surface that is in contact with the lid, a mirror-polished finish that increases the effectiveness of the airtight seal of the valves, and the part of the lid that is in contact with the surface of the covers may or may not comprise a mirror-polished finish.

In one characteristic of the invention, the first cover and/or the second cover comprises at least one plug, sized to be inserted into the one or more primary channels and/or into the one or more secondary channels.

In this way, the airtight seal of the two-way steam release mechanism is reinforced, since the various channels are made airtight by the plugs. Additionally, this does not change the general function of the two-way steam release mechanism, as the flow can continue to circulate in the channels above a certain pressure.

The invention also pertains to a storage or reheating canister comprising a lid and a container with an upper edge that cooperates with the airtight attachment means of the lid.

In one characteristic of the invention, the upper edge has an oblong profile that is inserted into the first sealing groove to form the first interior space or into the second sealing groove to form the second interior space.

The advantage is increasing the airtight seal of the canister when it is turned over.

In one characteristic of the invention, the canister comprises a cap with a free edge that cooperates with the first sealing groove or the second sealing groove so as to form an airtight interior space.

BRIEF DESCRIPTION OF THE DRAWINGS

The objectives, aspects and advantages of this invention will be better understood through the description provided below of one particular method of implementing the invention, which is provided as a non-limiting example, in reference to the attached drawings, in which.

DETAILED DESCRIPTION OF THE INVENTION

Figure 1:
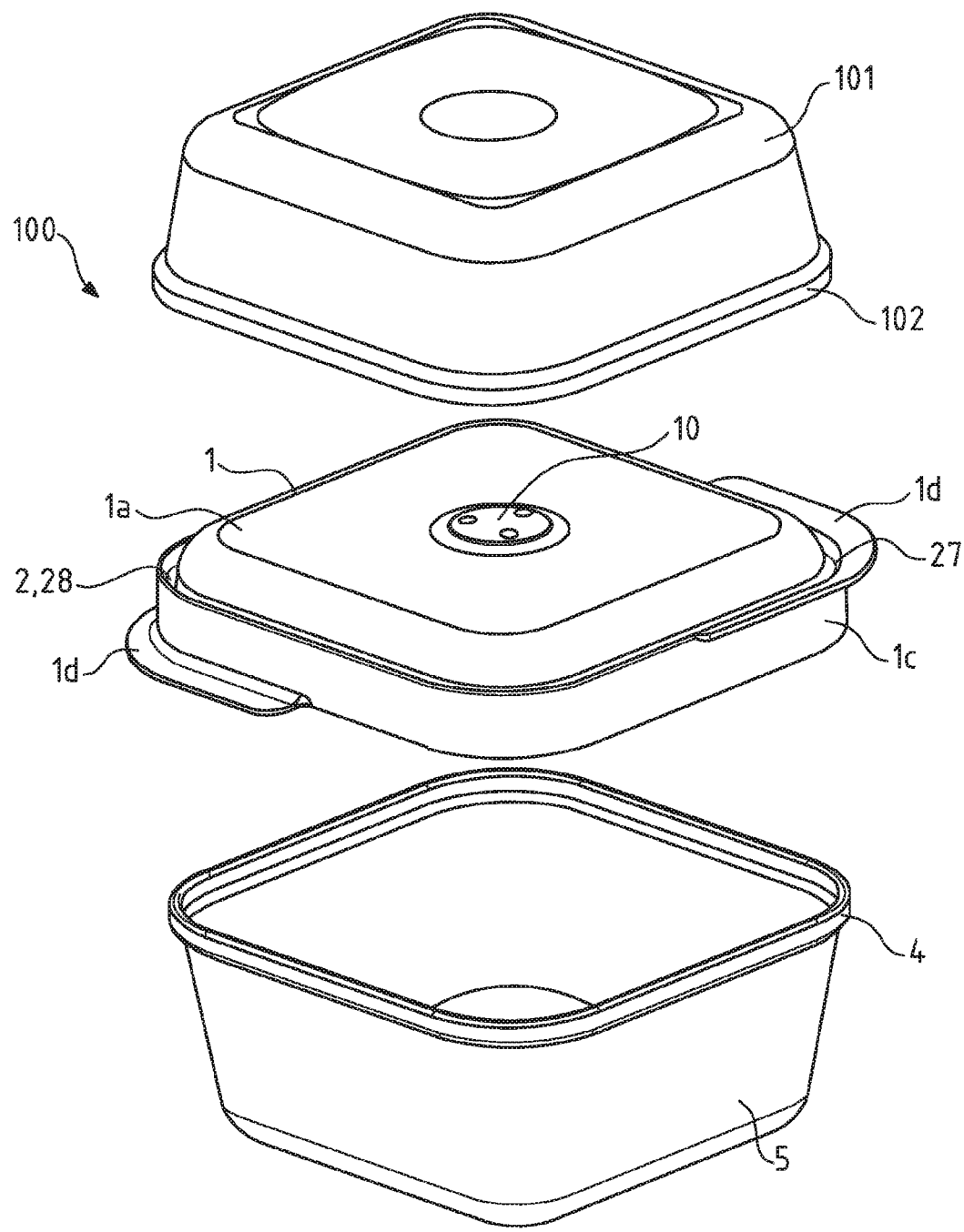
FIG. 1 is a perspective view of a canister described in the invention.
Figure 2:
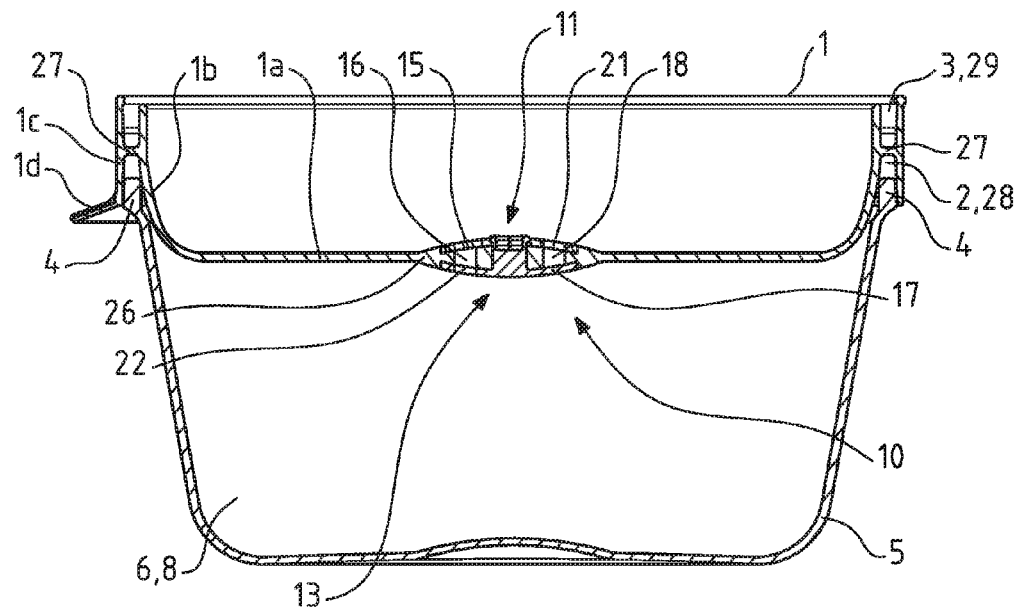
FIG. 2 presents a cross-section view of a canister in a first method of closure and with a first method of implementing the steam release mechanism.

As shown in FIGS. 1 and 2, the invention pertains to a lid (1) comprising a portion in relief that consists of a bottom wall (1a), which is advantageously flat, and one or more side walls (1b) that surround the bottom wall (1a) so as to form a container for solid or liquid food.

Figure 3:
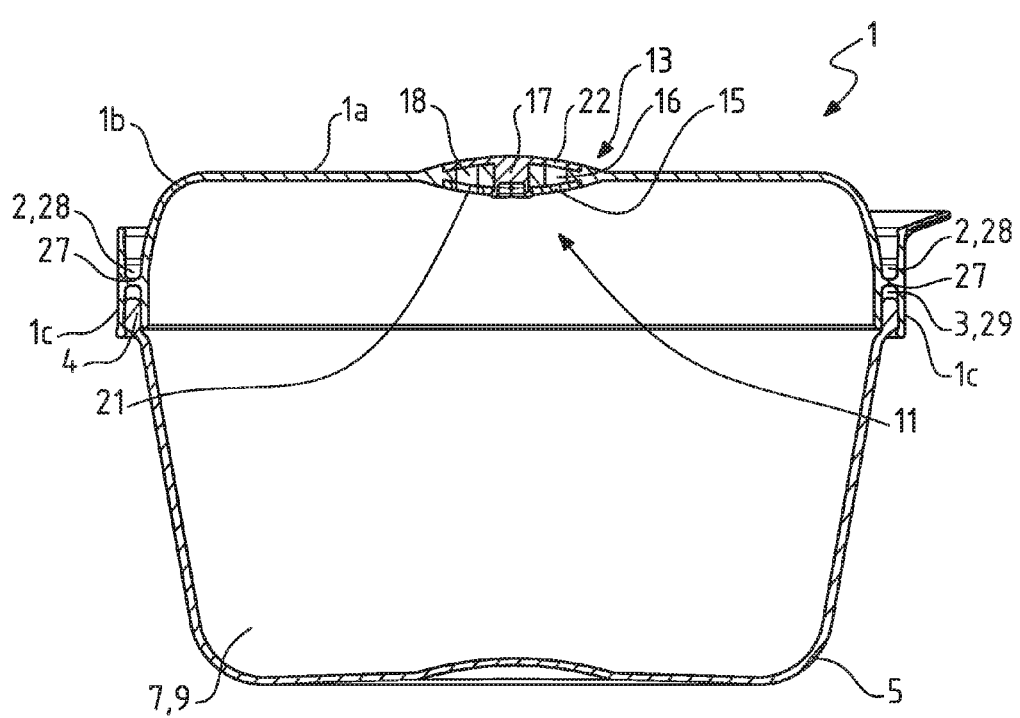
FIG. 3 presents a cross-section view of a canister in a second method of closure and with the first method of implementing the steam release mechanism.

As shown in FIG. 3, this lid (1) comprises a first (2) and a second (3) attachment means, which consist of a flap (27) positioned on the perimeter and the exterior of the lid (1). More specifically, the flap (27) extends from the side wall (1b), perpendicularly toward the exterior of the lid (1). This flap (27) may be positioned roughly in the middle of the side wall (1b). In other variations of implementing the flap (27) positioning, said flap may be positioned on the lower half of the side wall (1b), or even on the upper half of the side wall (1b). Preferably, it forms a right angle with the side wall (1b). In other positioning variations, it forms, with the side wall (1b), an angle of between 1 and 89° with respect to the side wall (1b).

In addition, the first (2) and the second (3) attachment means comprise a peripheral wall (1c) that is positioned at the exterior end of the flap (27). It extends parallel to the side wall (1b) of the lid (1) above and below the flap (27), so as to form a first (28) sealing groove that is positioned above the flap (27) and a second (29) sealing groove that is positioned below the flap (27). On the peripheral wall (1c), handles (1d) for gripping the lid (1) may be positioned.

The first (28) and the second (29) sealing grooves have profiles that are roughly U-shaped, and are formed, on one side, by the side wall (1b) of the lid (1) and, on the other side, by the peripheral wall (1c) of the flap (27).

The lid (1) is designed to be positioned on a container (5) that comprises an upper edge (4) for this purpose. The upper edge (4) has an oblong profile. More precisely, this upper edge (4) is intended to cooperate with the first (2) attachment means or with the second (3) attachment means, such that the lid (1) may be positioned in a reversible manner on the container (5), thereby forming a storage canister (100) with a variable volume, depending on the position of the lid (1) on the container (5).

In addition to the lid (1) and the container (5), the storage or reheating canister (100) has a cap (101) that comprises a free edge (102) that cooperates with the first (28) sealing groove or with the second (29) sealing groove, so as to also form an airtight interior space.

These first (2) attachment means and second (3) attachment means are airtight, which means that air, steam or even liquids cannot pass through these attachment means (2, 3). Furthermore, said attachment means are not limited to the construction previously described, but may also be magnetic attachment means, hook attachment means, or any other means capable of effecting the intended function, which is to fasten the lid (1), the container (5) and, when applicable, the cap (101) together in an airtight manner and in different methods of closing the canister (100).

As shown in FIG. 2, which presents a first method of closing the canister (100), the lid (1) is positioned on the container (5), and the upper edge (4) is inserted into the first (2) attachment means consisting of the first (28) sealing groove to form a first (6) closed interior space. The storage canister (100) thus formed is airtight.

In this first method of closure, the bottom wall (1a) of the lid (1) extends toward the interior of the container (5) such that the bottom wall (1a) is below the upper edge (4) of the container. This first (6) closed interior space thus makes it possible to contain, store and reheat food, and it defines a first (8) food storage or reheating volume that corresponds to the entire space that the food can occupy in this first (6) closed interior space.

As shown in FIG. 3, which presents a second method of closing the canister (100), the upper edge (4) is inserted into the second (3) attachment means, consisting of the second (29) sealing groove to form a second (7) closed interior space. In this configuration, the bottom wall (1a) of the lid (1) extends toward the exterior of the container (5), and the bottom wall (1a) of the lid (1) is thus above the upper edge (4) of the container (5). This second (7) closed interior space can also contain, store and reheat food, and it defines a second (9) volume that corresponds to the entire space that food may occupy in the second (7) closed interior space.

The second (9) volume is generally larger than the first (8) volume, and can therefore hold a larger volume of food for reheating or storage.

In addition, the lid (1) comprises a two-way steam release mechanism (10) that is made in a non-limiting way according to a first method of implementation or according to a second method of implementation.

In the first or the second method of implementing the two-way steam release mechanism (10), which can be seen in FIGS. 2 through 6, said mechanism consists of a first (11) valve and a second (13) valve. The first (11) valve and the second (13) valve are positioned on the lid (1) and function in opposition, as will be explained below.

In another positioning variation of the two-way steam release mechanism (10), not depicted, the first (11) valve and the second (13) valve are positioned on the container (5).

In both methods of implementing the two-way steam release mechanism (10), the first (11) valve consists of a first (15) cover positioned and fastened on one of the surfaces of the lid (1). The first (11) valve also comprises one or more primary channels (16) positioned below the first (11) valve and which pass through the lid (1) from one side to the other. On the surface of the lid (1) where the first cover (15) is located, the one or more openings of these one or more primary channels (16) are entirely covered in an airtight manner. In general, the term "airtight" means that a liquid or gas flow cannot cross or pass through. In this specific case, the flow that passes through the one or more primary channels (16) is entirely blocked by the first (15) cover below a certain pressure (P0) exerted by that flow.

As for the second (13) valve, it consists of a second (17) cover positioned on the surface of the lid (1) opposite the first (15) cover. The second (13) valve comprises one or more secondary channels (18) passing through the lid (1) from one side to the other. These one or more secondary channels (18) are different from the one or more primary channels (16), but these different channels (16, 18) all go all the way through from one side of the lid (1) to the other. These one or more secondary channels (18) are entirely covered in an airtight manner by the second (17) cover, such that a flow of liquid or gas that passes through the one or more secondary channels (18) is blocked by the second (17) cover if the pressure exerted by this flow is lower than Pressure P0.

In the invention, the covers (15, 17) are circular discs that are a few millimeters thick.

In other variations of implementing the covers (15, 17), their shapes may be square, rectangular or any other shape.

The covers (15,17) are made of silicone or thermoplastic elastomers (TPE).

Figure 4:
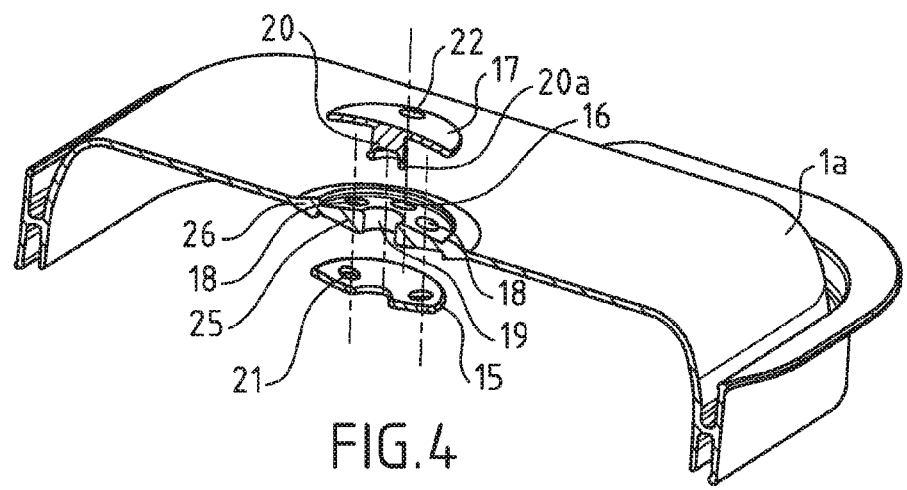
FIG. 4 presents an exploded, perspective view of the lid with a steam release mechanism in the first method of implementation.

In the first method of implementing the two-way steam release mechanism (10), which can be seen in FIGS. 2 through 4, the second (17) cover is positioned and fastened opposite the first (15) cover. In this way, the one or more secondary channels (18) passing through the lid (1) are covered in an airtight manner by the first (15) cover, and the one or more primary channels (16) are thus also covered in an airtight manner by the second (17) cover.

In order for the flows to be able to circulate in the different channels, the first (15) cover comprises one or more primary through-holes (21). These are positioned opposite the one or more secondary channels (18) in order to allow a flow to enter into the one or more secondary channels (18).

In the same way, the second (17) cover comprises one or more secondary through-holes (22) that are positioned opposite the one or more primary channels (16), to allow the flow to enter the one or more primary channels (16).

Because the one or more secondary channels (18) are different from the one more primary channels (16), the one or more primary through-holes (21) are staggered with respect to the one or more secondary through-holes (22).

Figure 7:
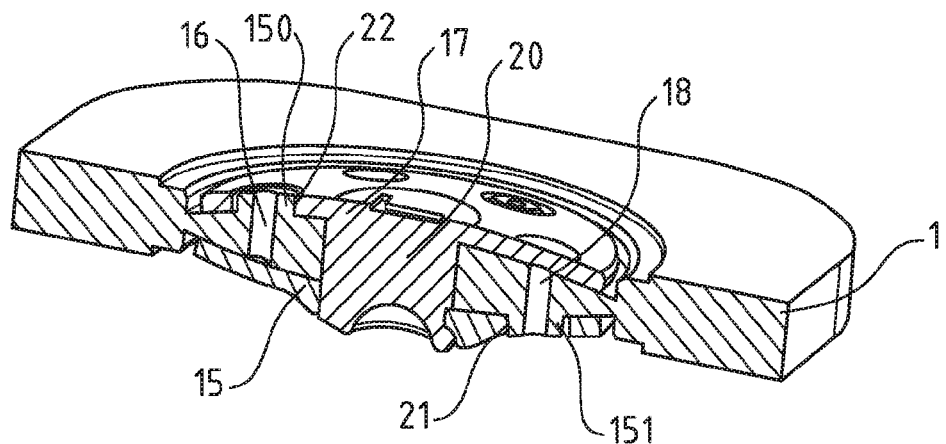
FIG. 7 presents a cross-section, perspective view of the steam release mechanism in one variation of implementation.

In one variation of implementing the one or more primary channels (16) or the one or more secondary channels (18) that can be seen in FIG. 7, said channels comprise one or more shoulders (150, 151). These shoulders (150, 151) come into the one or more primary through-holes (21) or into the one or more secondary through-holes (22), respectively. The purpose of these shoulders (150, 151) is to increase the effectiveness of the airtight seal by limiting the passage of water between the covers (15, 17) and the lid (1).

Still in reference to FIGS. 2 through 4, and in order to fasten the first (15) cover and the second (17) cover onto the lid (1), a shared attachment means is used, which comprises a central hub (20). This central hub (20) is connected to the first (15) cover and to the second (17) cover through a central opening (19) that is made in the lid (1) and that goes all the way through the lid (1) from one side to the other. The central hub (20) may be glued or soldered to the first (15) cover or to the second (17) cover, for example, by molding. The central hub (20) is tightly mounted in the central opening (19).

The central hub (20) is appreciably longer than the length of the central opening (19), such that a portion protrudes past said central opening (19) on the side opposite the second cover (17). The portion of the central hub (20) that protrudes from the side opposite the second (17) cover makes it possible to mechanically fasten the first (15) cover with the second (17) cover. This mechanical fastening can be done using clips (20a).

The length of the central hub (20) can thus be determined so as to have an assembly of the two covers (15, 17) under tension against the lid (1).

In one variation of implementation, not depicted, the central hub (20) and the second (17) cover are removable from one another and are held by an additional fastening means, not depicted. This fastening means is preferably mechanical, such as clips, for example, but it is not limited to mechanical means, and can also be magnetic.

The lid (1) can also comprise a domed area (25) on which the covers (15, 17) rest. This domed area (25) rises from the two sides of the lid (1) and, as previously described, the first (15) cover and the second (17) cover are positioned under tension on this domed area (25).

In this case, the one or more primary channels (16) and the one or more secondary channels (18) pass through the domed area (25).

The advantage of such a domed area (25) is to reinforce the airtight seal of the valves (11, 13) to the flows.

In supplement to the domed area (25), the lid (1) comprises a flange (26) that surrounds the covers (15, 17). This flange (26) extends from the lid (1) and reaches at least the height of the covers (15, 17). The covers (25, 17) are tightly mounted in the flange (26). As shown in FIGS. 2 and 3, the flange (26) is circular, so as to conform to the circular shape of the covers (15, 17).

The advantage of the flange (26) is that, in combination with the domed area (25), the airtight seal of the valves (11, 13) is reinforced.

Figure 5:
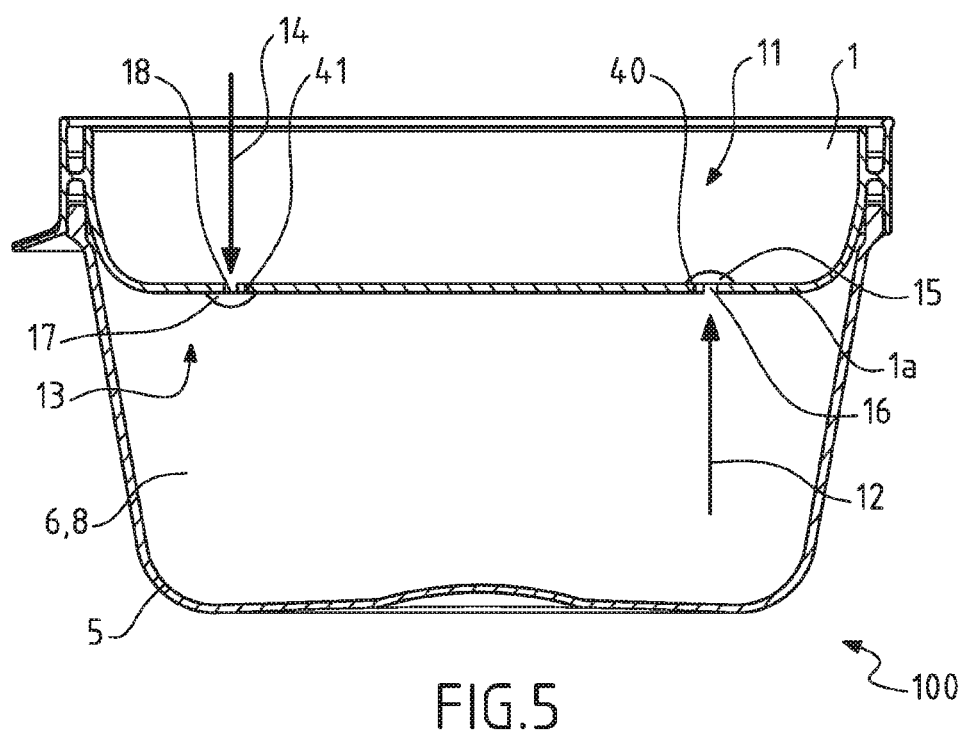
FIG. 5 presents a cross-section view of a canister in the first method of closure with a second method of implementing the steam release mechanism.
Figure 6:
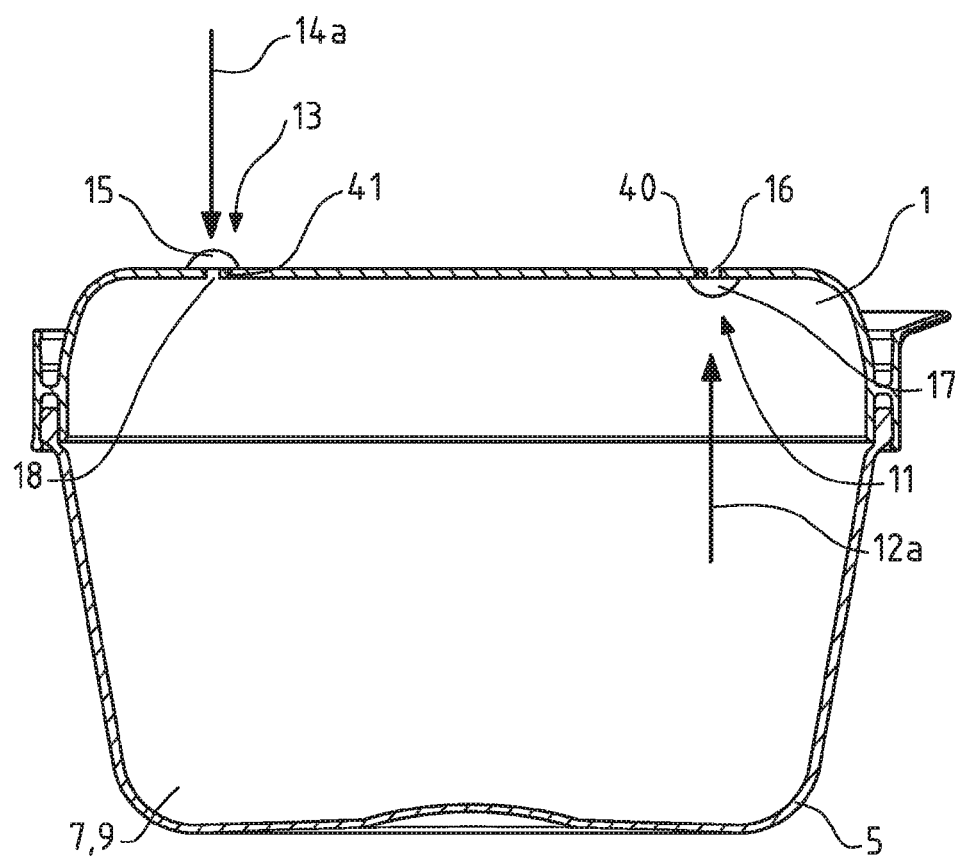
FIG. 6 presents a cross-section view of a canister in the second method of closure with the second method of implementing the steam release mechanism.

In the second method of implementing the two-way steam release mechanism (10), which can be seen in FIGS. 5 and 6, the first (11) valve and the second (13) valve are not positioned opposite one another and are separate.

In this case, the first (11) valve still consists of a first (15) cover and one or more primary channels (16) passing through the lid (1). The first (15) cover is fastened onto one of the surfaces of the lid (1) by a first (40) fastening means, and the first (15) cover completely covers the one or more primary channels (16) in an airtight manner.

The second (13) valve also consists of a second (17) cover and one or more secondary channels (18) passing through the lid (1). The second (17) cover is fastened onto the lid (1), on the side opposite the first (15) cover, by a second (41) fastening means. The second (17) cover completely covers the one or more secondary channels (18) in an airtight manner.

Whether in the first or the second method of implementing the two-way steam release mechanism (10), the covers (15,17) may comprise, on their surface that is in contact with the lid (1), a surface with a mirror-polished finish intended to increase the effectiveness of the airtight seal of the valves (11, 13). The portion of the lid (1) in contact with the surface of the covers (15, 17) may or may not also comprise a surface with a mirror-polished finish.

We will now describe the functioning of the two-way steam release mechanism (10) in its first method of implementation, which can be seen in FIGS. 2 through 4.

As shown in FIG. 2, the canister (100) is in its first method of closure, which is to say, the bottom wall (1a) of the lid (1) is below the upper edge (4) of the container (5) and the canister (100) thus forms the first (6) closed interior space.

As described above, the first (6) closed interior space can be used to contain, store and reheat food, and it defines the first (8) food storage or reheating volume.

This method of closure is advantageous when there is a small volume of food to be stored or reheated and a user wishes to decrease the volume of the canister (100) in order to prevent food spoilage, which is caused by the air contained inside the storage volume.

The food being stored or reheated is therefore placed in the first (6) interior space.

Because this first (6) interior space is closed and airtight, the food contained in the first (8) storage or reheating volume will heat up and produce a flow of air or steam when the canister (100) is placed in an operating microwave oven.

The two-way steam release mechanism (10) is designed to release this steam to the exterior of the first (6) interior space.

This release of the flow to the exterior of the first (6) interior space occurs when excess pressure is created inside the first (6) interior space. The term "excess pressure" means that the pressure inside the first (6) interior space is greater than the exterior pressure. To re-establish a pressure equilibrium, the flow must therefore be released to the exterior of the first (6) interior space. The excess pressure is caused by heating the food or the air contained inside the first (6) interior space.

The flow will first pass through the one or more secondary through-holes (22) of the second (17) cover, in order to enter the one or more primary channels (16). At the end of these one or more primary channels (16), the flow is then blocked by the first (15) airtight cover. Below Pressure P0, the flow remains blocked. When the pressure inside the first (6) interior space reaches Pressure P0, then the first (15) cover warps so as to allow the flow to pass from the first (6) interior space to the exterior of said space.

At the same time, the second (17) cover is still positioned under tension against the lid (1) and is still airtight.

Obviously, in this method of closure, the first (2) attachment means makes it possible to fasten the lid (1) and the container (5) until an interior pressure of at least P0 is reached in the first (6) interior space.

If Pressure P0 is not reached, the two-way steam release mechanism (10) is also designed to ensure a watertight seal of the first (6) interior space when the food being stored is a liquid, for example. This means that the two-way steam release mechanism (10) is designed such that the liquid resting on the bottom of the lid (1) will not leak through the two-way mechanism (10) and will not go into the first (6) interior space, as long as the pressure inside the first (6) interior space does not exceed P0. This is due to the fact that, firstly, the first (15) cover is not warped by the passage of the flow from the first (6) interior space toward the exterior of said space, and secondly, the second (17) cover is rigid enough not to be warped by the liquid that has entered into the one or more secondary channels (18) and that is therefore applying pressure on the second (17) cover, which thus retains its airtight seal.

Now in reference to FIG. 3, which presents the second method of closing the canister (100), which is to say when the bottom wall (1a) of the lid (1) extends toward the exterior of the container (5), we will describe the functioning of the two-way steam release mechanism, still in its first method of implementation.

In this situation, the bottom wall (1a) of the lid (1) is then located above the upper edge (4) of the container (5) and forms the second (7) interior space and the second (9) volume.

This method of closure is advantageous when a user needs to store a large volume of food.

The two-way steam release mechanism (10) is also designed to release a flow of steam or air to the exterior of the second (7) interior space when said space is in a state of excess pressure.

In the same way as described above, the term "excess pressure" means that the pressure inside the second (7) interior space is greater than the exterior pressure. In order to re-establish a pressure equilibrium, the flow must therefore be released to the exterior of this second (7) interior space.

The flow will first pass through the one or more primary through-holes (21) of the first (15) cover, in order to enter the one or more secondary channels (18). At the end of these one or more secondary channels (18), the flow is then blocked by the second (17) airtight cover. Below Pressure P0, this flow remains blocked in the one or more secondary channels (18). When the pressure inside the second (7) interior space reaches this Pressure P0, then the second (17) cover warps so as to allow the flow to pass from the second (17) interior space toward the exterior.

At the same time, the first (15) cover is still positioned under tension against the lid (1), and is still airtight.

Obviously, in this method of functioning, the second (3) attachment means makes it possible to fasten the lid (1) and the container (5) until the pressure inside the second (7) interior space reaches at least P0.

If Pressure P0 is not reached, the two-way steam release mechanism (10) is also designed to ensure a watertight seal of the second (7) interior space.

This is due to the fact that the second (17) cover is not warped by the passage of the flow from the second (7) interior space toward the exterior of said space.

In reference to FIGS. 5 and 6, which present the second method of implementing the two-way steam release mechanism, the first (15) valve and the second (17) valve are staggered with respect to one another.

In this case, the one or more primary channels (16) are no longer covered by the second (17) cover, and the one or more secondary channels (18) are no longer covered by the first (15) cover.

Thus, in the first closure position of the canister (100), and above Pressure P0, the first (11) valve will allow the flow to pass through to the exterior of the first (6) interior space, in a first (12) direction of movement, which is directed from inside the first (6) interior space toward the exterior.

More precisely, the flow circulates inside the one or more primary channels (16) and above Pressure P0, the first (15) cover warps under the effect of the flow, so as to allow the flow to pass through in the first direction of movement.

At the same time, the second (13) valve, positioned opposite the first (11) valve, does not allow the steam to pass through to the exterior of the first (6) interior space in the first (12) direction of movement.

In this case, the flow does not even circulate in the one or more secondary channels (18).

In the present case, where the pressure in the first (6) interior space is lower than P0, the first (15) cover of the first (11) valve is not warped and is airtight in the first (12) direction of movement. In a second (14) direction of movement, which is directed from outside the first (6) interior space toward the inside of said space, the first (15) cover is also airtight. In the case in point, the flow moving in the second (14) direction of movement may not pass through the first (11) valve.

At the same time, it can be observed that some water may potentially be located in the one or more secondary channels (18) of the second (13) valve, without said valve being able to warp the second (17) cover. In the case in point, the flow moving in the second (14) direction of movement cannot pass through the second (13) valve.

In the method of closing the canister (100) shown in FIG. 6, the first (11) valve, above Pressure P0, does not allow the flow to pass through to the exterior of the second (7) interior space, in a third (12a) direction of movement, which is directed from inside the second (7) interior space toward the exterior of said space.

As for the second (13) valve, it allows the flow to pass through to the exterior of the second (7) interior space above Pressure P0 in this third direction (12a) of movement.

Below Pressure P0, the second (13) valve does not allow the flow to pass through in a fourth (14a) direction of movement opposite the third direction (12a) of movement, which is to say directed from the exterior of the second (7) interior space toward the interior of said space.

The first (11) valve, above Pressure P0, is airtight to any flow in the fourth (14a) direction of movement.

As a result, the canister (100) is adapted for storing food.

Figure 8:
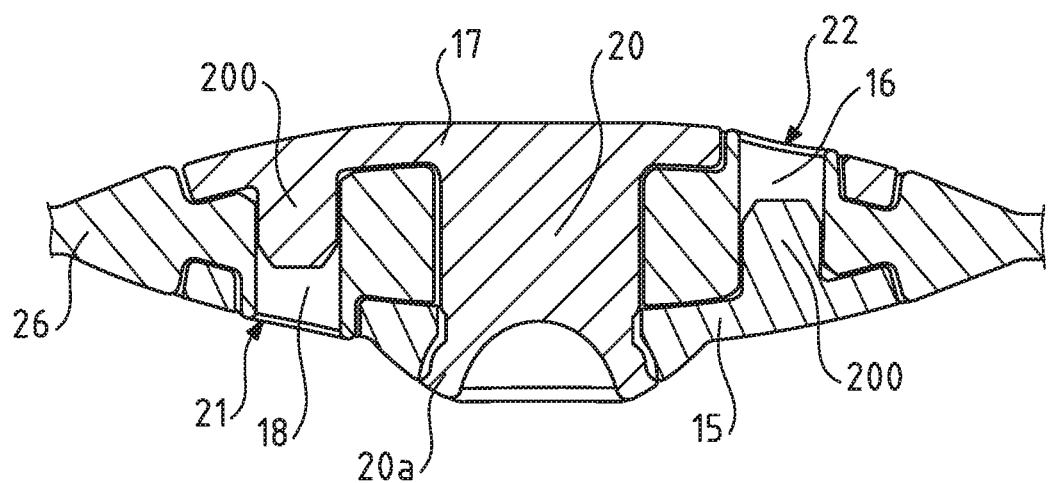
FIG. 8 presents a cross-section view in one variation of implementation.

Additionally, in order to reinforce the airtight seal of the two-way steam release mechanism (10), the first (15) cover may comprise one or more plugs (200), as shown in FIG. 8. These one or more plugs (200) are sized to be inserted into the one or more secondary channels (18).

In the same way, the second (17) cover may comprise one or more plugs (200), as shown in FIG. 8, and these one or more plugs (200) are sized to be inserted into the one or more primary channels (16).

In this way, the airtight seal of the canister (100) is reinforced.

It is understood that various modifications and/or improvements that are obvious to an expert in the field may be made to the method of implementing the invention presented in this description, while still remaining within the scope of the invention defined by the attached claims.

Thus, in one variation of implementation not depicted, the lid may comprise a domed or spherical wall.

The invention claimed is:

1. Reversible lid (1) for a storage or reheating canister comprising a first (2) airtight attachment means designed to cooperate with an upper edge (4) of a container (5) when the lid (1) is arranged along a first direction on the container (5) and a second (3) airtight attachment means designed to cooperate with said upper edge (4) of the container (5) when the lid is arranged in the reverse direction on the container (5), the lid (1) having a portion in relief that can be oriented toward the interior of the container (5) to form with said container a first (6) closed interior space with a first (8) volume, or oriented toward the exterior of the container (5) to form with said container a second (7) closed interior space with a second (9) volume, separate from the first (8) volume, characterized in that the lid (1) comprises a two-way steam release mechanism (10) connecting a first surface of the lid and a second opposite surface of the lid, and in that said two-way release mechanism (10) allows a flow to pass between the first surface and the second opposite surface of the lid (1) when the pressure difference between the first surface and the second opposite surface is greater than or equal to a value (P0), particularly when reheating food in a microwave oven, wherein the two-way steam release mechanism comprises a first cover fastened to the first surface of the lid and a second cover fastened to the second opposite surface of the lid, wherein the lid comprises a flange extending therefrom to at least a height of the first and second covers such that the flange surrounds the first and second covers and the first and second covers are tightly mounted within the flange, wherein the two-way steam release mechanism (10) comprises:

a first (11) one-way valve that allows a flow of steam to pass through when the pressure difference between a first surface and a second surface of the lid is greater than or equal to a value (P0), and that is airtight when the pressure difference between the first and the second surfaces of the lid is less than P0; and a second (13) valve, positioned opposite the first (11) valve, which allows a flow of steam to pass through when the pressure difference between the second surface and the first surface of the lid is greater than or equal to a value (P0), and that is airtight when the pressure difference between the second and the first surfaces of the lid is less than P0, wherein the first (11) valve comprises the first cover and one or more primary channels (16) passing through the lid (1), said first cover is fastened onto the first surface of the lid by a first (40) fastening means, and it covers entirely and in an airtight manner the one or more primary channels (16), and starting from Pressure P0 and above, said first cover warps under the effect of a flow that circulates in the one or more primary channels (16); and the second valve comprises the second cover and one or more secondary channels (18) passing through the lid (1), said second cover is fastened onto the second opposite surface of the lid (1) by a second (41) fastening means, and it covers completely and in an airtight manner the one or more secondary channels (18), and starting from Pressure P0 and above, said second cover warps under the effect of a flow circulates in the one or more secondary channels (18), and wherein the first (40) fastening means and the second (41) fastening means are assembled into a shared fastening means that comprises a central opening (19) that passes through the lid (1) from one side of said lid to the other and in which a central hub (20) is tightly mounted, which fastens the first cover and the second cover together, and the first cover is an airtight cover on the one or more secondary channels (18) and the second cover is an airtight cover on the one or more primary channels (16).

2. Reversible lid (1) described in claim 1, wherein the two-way steam release mechanism (10) is airtight when the pressure difference between the two surfaces of the lid is lower than the value (P0).

3. Reversible lid (1) described in claim 1, wherein the two-way steam release mechanism (10) is designed to ensure a watertight seal.

4. Reversible lid (1) described in claim 1, wherein the first cover comprises one or more primary through-holes (21) that are positioned opposite the one or more secondary channels (18), and the second cover comprises one or more secondary through-holes (22) that are positioned opposite the one or more primary channels (16).

5. Reversible lid (1) described in claim 4, wherein the one or more primary channels (16) or the one or more secondary channels (18) comprise a shoulder (150, 151) that goes up into the one or more primary through-holes (21) or into the one or more secondary through-holes (22) so as to increase the effectiveness of the airtight seal by limiting the passage of water between the first and second covers and the lid (1).

6. Reversible lid (1) described in claim 1, wherein the lid (1) comprises a domed area (25) on which the first and second covers are positioned under tension so as to prevent flows from passing through.

7. Reversible lid (1) described in claim 1, wherein the first and second covers are made of one of silicone or thermoplastic elastomers (TPE).

8. Reversible lid (1) described in claim 1, wherein the first and second covers comprise, on their surface that is in contact with the lid (1), a mirror-polished finish designed to increase the effectiveness of the airtight seal of the valves (11, 13), and the portion of the lid (1) in contact with the surface of the first and second covers may or may not also comprise a surface with a mirror-polished finish.

9. Reversible lid (1) described in claim 8, wherein the first (2) airtight attachment means and the second (3) airtight attachment means comprises a flap (27) positioned on the perimeter and the exterior of the lid (1) and that comprises a first (28) sealing groove located on top of the flap (27) and a second (29) sealing groove located below the flap (27) and the first (28) and the second (29) grooves have a U-shaped profile.

10. Reversible lid (1) described in claim 1, wherein the first cover and/or the second cover comprises at least one plug (200) sized to be inserted into the one or more primary channels (16) and/or into the one or more secondary channels (18).

11. Storage or reheating canister (100) comprising a lid (1) described in claim 1, and a container (5) that comprises an upper edge (4) that cooperates with the airtight attachment means (2, 3) of the lid (1), wherein the upper edge (4) has an oblong profile that is inserted into the first (28) sealing groove to form the first (6) interior space or into the second (29) sealing groove to form the second (7) interior space.

12. Storage or reheating canister (100) described in claim 11, wherein the canister (100) comprises a cap (101) with a free edge (102) that cooperates with the first (28) sealing groove or with the second (29) sealing groove, so as to form an airtight interior space.

* * * * *